United States Patent [19]

Kunkle

[11] Patent Number: 4,861,057
[45] Date of Patent: Aug. 29, 1989

[54] CART AND METHOD OF USE

[76] Inventor: Jerry A. Kunkle, 1314 S. 2nd St., Arkansas City, Kans. 67005

[21] Appl. No.: 158,604

[22] Filed: Feb. 22, 1988

[51] Int. Cl.⁴ .............................................. B62B 1/04
[52] U.S. Cl. ............................. 280/47.131; 280/47.24; 280/47.26; 280/47.33; 280/63; 280/652; 280/655; 403/237
[58] Field of Search ................. 280/47.13 R, 47.13 B, 280/43.1, 63, 47.24, 47.26, 47.33, 47.37 R, 47.30, 652, 655; 403/191, 234, 235, 237

[56] References Cited

U.S. PATENT DOCUMENTS

| | | | |
|---|---|---|---|
| 528,939 | 11/1984 | Grabill | 280/47.13 R |
| 759,289 | 5/1904 | Leland | 280/47.33 |
| 900,455 | 10/1908 | Weir | 280/47.13 R |
| 1,376,496 | 5/1921 | Woodruff | 280/47.13 B |
| 1,939,863 | 12/1933 | Seiter | 280/80 |
| 2,042,598 | 6/1936 | Harvey | 115/1 |
| 2,115,864 | 5/1938 | Livermon | 9/1 |
| 2,426,244 | 8/1947 | Sitton | 280/61 |
| 2,818,268 | 12/1957 | Johnson | 280/42 |
| 2,966,368 | 12/1960 | Engnell | 280/179 |
| 2,970,846 | 2/1961 | Boston | 280/40 |
| 3,046,040 | 7/1962 | Luper | 248/230 |
| 3,913,762 | 10/1975 | Alexander | 280/47.24 |
| 4,261,596 | 4/1981 | Douglas | 280/652 |
| 4,366,933 | 1/1983 | Broussard | 280/47.26 |

FOREIGN PATENT DOCUMENTS

| | | | |
|---|---|---|---|
| 1122417 | 9/1956 | France | 280/652 |
| 2414431 | 9/1979 | France | 280/47.13 B |

Primary Examiner—Charles A. Marmor
Assistant Examiner—Eric Culbreth
Attorney, Agent, or Firm—Laney, Dougherty, Hessin & Beavers

[57] ABSTRACT

A cart having a plurality of spaced upper skid members supported by a lower bracing member to which two wheels are rotatably attached, side bracing members connected between the lower bracing member and the plurality of spaced upper skid members, and upper bracing members connected between side bracing members is described. Two detachable handles, a shelf, and a box for use with such a cart are also described, as is a method of using such a cart to enable one person to move a small water craft along a support surface.

7 Claims, 5 Drawing Sheets

CART AND METHOD OF USE

BACKGROUND OF THE INVENTION

1. Field of the Invention

This invention relates generally to wheeled carts for carrying a load and more particularly, but not by way of limitation, to two-wheeled carts and methods of use for enabling one person to move a small water craft along a support surface.

2. Description of the Prior Art

Various other wheeled carts and two-wheeled supports, some for transporting small water craft, have been disclosed in the following patents known to me.

A patent to Sitton, U.S. Pat. No. 2,426,244, discloses a two-wheeled dolly, comprising a rectangular frame composed of two pairs of angle bars, a central beam secured between one such pair of angle bars, and two U-shaped wheel brackets carrying two wheels and connected to each other by a brace bar. Brace bars form a triangular structure at each end of the frame and connect the lower ends of the brackets to the angle bars. An extension or platform extends from the central beam to a depressed portion of one of the angle bars.

U.S. Pat. No. 900,455 to Weir discloses the use of a pair of parallel, oppositely arranged trusses, having upper bars and downwardly converging truss-bars, as the sides of the body-frame of a cart. Central king-posts are also provided as part of the trusses. All of these bars can, if desired, be made of suitable piping. These trusses are connected at their ends by cross-bars. An axle on which the two wheels of the cart are mounted is disposed through central openings in the king-posts, with bearing blocks provided for bearing upon the under side of the axle and being held in place by keys inserted through openings in the king-posts.

U.S. Pat. No. 528,939 to Grabill also discloses a two-wheeled cart having side bars or beams rigidly connected at their lower sides to an axle which has two wheels mounted on its ends. The side beams are provided with seats or pockets at their ends for receiving removable end beams of varying length. Eyes or staples which are rigidly secured to each of the end beams are also disclosed as suited for the connection of detachable tongues to the cart. Spurs adapted to be disposed in threaded openings in the end beams are disclosed for holding the load of the cart and preventing it from slipping.

Related devices disclosed in prior patents which specifically contemplate use in connection with boats or small water craft include those found in the patents to U.S. Pat. Nos. to Woodruff, 1,376,496; Seiter, 1,939,863; Harvey, 2,042,598; Livermon, 2,115,864; Engnell, 2,966,368; Boston, 2,970,846, and Johnson, 2,818,268. Several of these devices are disclosed as supporting the small water craft at least in part by connection with the gunwales of the craft or with other points near the upper edge of the sides of the craft, as in the patents to Woodruff, Seiter, and Harvey, with the patent to Harvey additionally disclosing the use of a strap passed underneath the boat to provide additional support for the boat The patent to Livermon provides that the axle for a wheel, and other portions of the device in Livermon are disposed in a part of the water craft itself.

U.S. Pat. No. 2,970,846 to Boston discloses a foldable boat carrier having a frame of generally rectangular shape and supported by a pair of wheels Extending longitudinally across the frame are two pairs of supporting arms with a rubber tube covering a portion of each arm. Each supporting arm is connected at one end to one end of the frame at a side thereof by a vertical brace and at the other end to one end of a transversely extending brace. Tie-downs are also disclosed for connecting to the boat and to the ends of the frame. It is an object of the carrier disclosed in Boston to enable one person to transport the boat either to or from the water by holding onto either end of the boat.

U.S. Pat. No. 2,966,368 to Engnell discloses a two-wheeled trailer having a bracket equipped with bearings to support an axle connecting the two wheels. Attached to the bracket adjacent either end, by a plurality of holes and bolts, are two pairs of inwardly inclined pivoted arms, each pair being connected to a clamping bar which is adapted for extending along the keel of a boat and for clamping down on the keel in response to the weight of the boat. Auxiliary support bars, with inwardly inclined upper ends and vertical slots in their lower portions for vertical adjustments of the bars, are disposed adjacent each end of the bracket, outward of the pairs of pivoted arms. These auxiliary support bars, however, are not used to normally support the boat, but to keep the boat from swaying when pulled over rough or broken ground.

U.S. Pat. No. 2,818,268 to Johnson discloses another folding boat trailer for supporting a boat on rests to which the bottom of the boat is drawn tightly and which extend parallel to the wheels of the trailer. The trailer is secured to the boat by clamps at the extremities of a pair of folding arms pivotally connected to a central body of the trailer, which clamps are attached to the gunwales of the boat.

None of the above patents, however, discloses a cart including a shelf below a support structure of the cart which is to engage the water craft or other load to be supported. None of the above patents discloses a cart including a handle detachably connected to both a lower bracing member and an upper bracing member of the support structure of the cart. Nor do any of the above disclosures suggest a cart including a box nested in the support structure. These features would enable the user of such a cart to carry a wider range of items with greater convenience than would be possible with devices not employing such features.

Other needs include the need for such a cart to enable one person to move a small water craft (i.e., one which has an end that one person can lift on land, such as a canoe) along a support surface with relative ease, and the need for such a cart to be of simple design and manufacture. There is a need also for a cart which meets the above needs and which is suitable for being stored conveniently, as in the water craft itself, when not in use and when the detachable handle is detached.

SUMMARY OF THE INVENTION

The present invention overcomes the above-noted and other shortcomings in the prior art and meets the aforementioned needs by providing a novel and improved cart which enables one person to move a small water craft along a support surface with relative ease and which can be used to carry a wide variety of items with convenience, which is simple of design and manufacture, and which may be conveniently stored when not in use.

The cart generally comprises a plurality of spaced upper skid members, bracing means for supporting the upper skid members, and two wheels rotatably mounted to the bracing means. In various configurations the cart further includes a box having an upper box portion and a lower box portion, or a shelf connected to the bracing means below the plurality of spaced upper skid members, or a detachable handle. The cart variously further includes first and second tie-down brackets connected to first and second respective spaced upper skid members, and strap means connected in turn to the first and second tie-down brackets to secure a load to the shelf and to the cart.

A particular embodiment of the present invention provides a cart for enabling one person to move a small water craft along a support surface upon which the cart and craft can be supported. This cart comprises two wheels and rigid frame means, to which the two wheels are connected, for pivoting forward about an axis of pivotation to a forward position and for pivoting rearward about the axis of pivotation to a horizontal position. In the forward position, a front end of the rigid frame means engages the support surface and a back end receives the water craft. In the horizontal position, the water craft rests across the rigid frame means so that only the two wheels of the cart engage the support surface.

The present invention also provides a method for using the cart of the present invention to enable one person to move a small water craft along a support surface. This method comprises pivoting the rigid frame of the cart about the axis of pivotation to the forward position, lifting a first portion of the craft, moving the first portion over the raised back end of the frame until a central portion of the water craft engages the raised back end, and pivoting the frame of the cart rearward so that only the two wheels of the cart engage the support surface. The user then applies a force to the water craft to rotate the wheels of the cart and move the cart and craft along the support surface. One person can thereby move the water craft from an unmounted position off the cart wherein the craft is entirely supported by the support surface itself to a mounted position on the cart, wherein only the two wheels of the cart engage the support surface.

Therefore, it is a general object of the present invention to provide a novel and improved cart for carrying a load, and to provide a novel and improved cart and method for enabling one person to move a small water craft along a support surface. Other and further objects, features and advantages of the present invention will be readily apparent to those skilled in the art when the following description of the preferred embodiments is read in conjunction with the accompanying drawings.

DETAILED DESCRIPTION OF THE PREFERRED EMBODIMENTS

Figures 1, 2, 3, 4, 5:
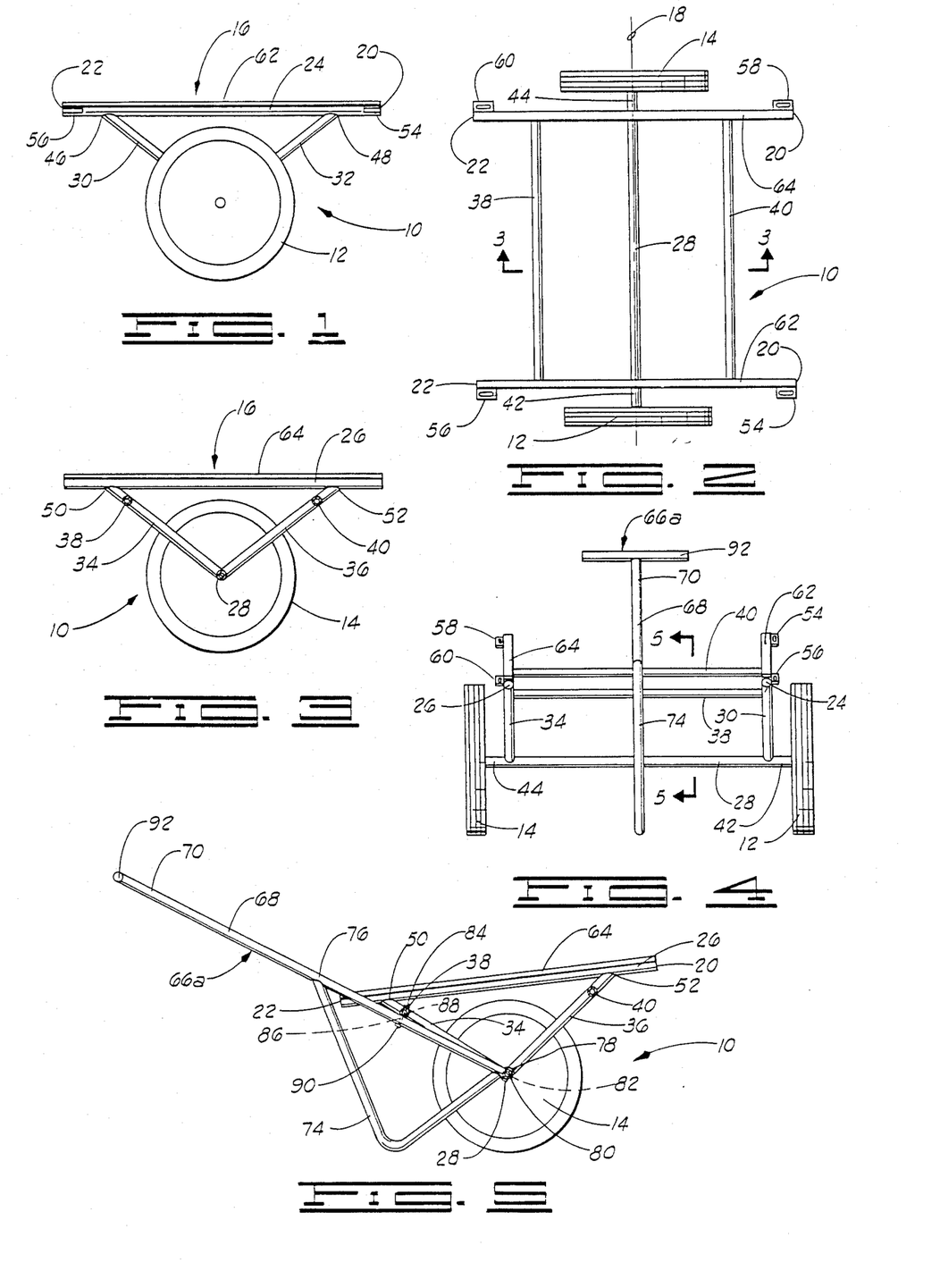
FIG. 1 is a side view of a preferred embodiment of the cart of the present invention.
FIG. 2 is a plan view of the preferred embodiment shown in FIG. 1.
FIG. 3 is a sectional view taken along line 3—3 in FIG. 2.
FIG. 4 is an end view of the preferred embodiment of the cart equipped with a first embodiment of a detachable handle.
FIG. 5 is a sectional view taken along line 5—5 in FIG. 4.
Figure 6:
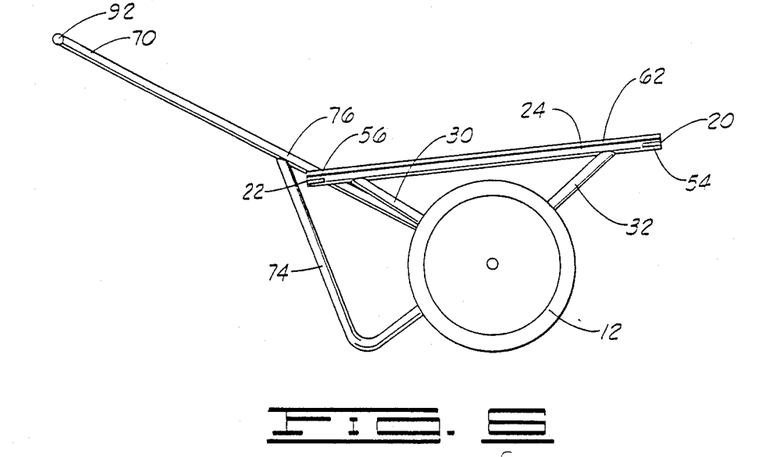
FIG. 6 is a side view of the cart depicted in FIGS. 4 and 5.

Referring now to the drawings, and more particularly to FIGS. 1-3, the cart of the present invention is shown and generally designated by the numeral 10. In the preferred embodiment shown, the cart 10 comprises two wheels 12, 14, and rigid frame means such as a frame 16 for pivoting about an axis of pivotation 18 to a forward position and rearward to a horizontal position. The frame 16 has a front end 20 and a back end 22, and includes two parallel, spaced upper skid members 24 and 26, a lower bracing member 28 to which are rotatably attached wheels 12 and 14, and side bracing members 30, 32, 34 and 36. The frame 16 also includes upper bracing members such as transverse bracing members 38 and 40 which are connected between the side bracing members 30 and 34, and side bracing members 32 and 36, respectively, below upper skid members 24 and 26.

All the above bracing members generally comprise rigid, straight rods or tubes or pipes, and are connected as described by conventional welding means and methods; however, other structural materials and connecting techniques can be used. In the preferred embodiment, side bracing members 30 and 32 extend obliquely upward from a first end 42 of the lower bracing member 28, while side bracing members 34 and 36 similarly extend obliquely upward from a second end 44 of the lower bracing member 28. Side bracing members 30 and 32, together with the lower bracing member 28, form the same angle with respect to each other as do side bracing members 34 and 36, and are substantially the same length as side bracing members 34 and 36. To further add to the stability and strength of the frame, the transverse bracing members 38 and 40 are disposed parallel to each other and to the lower bracing member 28, and connect by welded connections the two triangular structures formed by the side bracing members 30, 32, 34 and 36, and the upper skid members 24 and 26. As shown, the transverse bracing members 38 and 40 are spaced an equal distance below the upper skid members 24 and 26.

As further shown in FIG. 1, a location 46 at which the side bracing member 30 is welded to the upper skid member 24 is spaced from a location 48 at which the side bracing member 32 is welded to the upper skid member 24 by a distance greater than a diameter of the wheel 12. By virtue of the arrangement of the bracing members described above, substantially the same distance separates locations 50 and 52 (FIG. 3) at which the side bracing members 34 and 36, respectively, are welded to the upper skid member 26. The transverse bracing members 38 and 40 are of substantially the same length, so that, in sum, the frame 16 consists of two triangular structures of substantially equal dimension connected in parallel to each other by transverse bracing members 38 and 40 and by the lower bracing member 28, with the side bracing members acting as means for rigidly connecting the lower bracing member 28 to the transverse bracing members 38 and 40.

Further, as the wheels 12 and 14 are rotatably attached to the lower bracing member 28, in the frame 16 as described spaced upper skid members 24 and 26 extend substantially parallel to the wheels 12 and 14. Tie-down brackets 54 and 56 are welded to the upper skid member 24, and tie-down brackets 58 and 60 are welded to the upper skid member 26. Strips 62 and 64 of a resilient material are also attached to the upper skid members 24 and 26, respectively.

Referring now to FIGS. 4-7, the cart of FIGS. 1-3 is shown equipped with a first embodiment of a detachable handle, denoted by the reference numeral 66a. The handle 66a comprises a lifting member 68, having an upper end 70 and a lower end 72, which is detachably connected to the transverse bracing member 38 intermediate the upper end 70 and the lower end 72. The lifting member 68 may be constructed and configured in any number of ways so long as it is sufficiently strong to act to move the loaded cart from place to place, but in the preferred embodiment consists only of a straight tube or pipe. The handle 66a further includes a support stand defined by an angular member 74 connected, as by welding, between the lower end 72 of the lifting member 68 and a portion 76 of the lifting member 68 intermediate the upper end 70 and the lower end 72. The angular member 74 as shown comprises merely an angular tube or pipe having the general shape of a "V".

Figure 7:
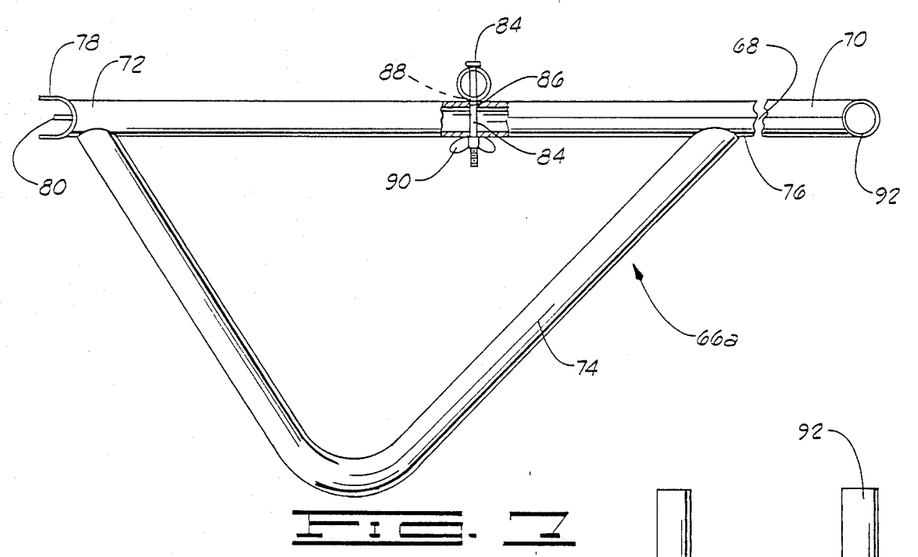
FIG. 7 is an enlarged side view of the first embodiment of a detachable handle.

The handle 66a also comprises receiving means for receiving the lower bracing member 28 into detachable engagement with the lower end 72 of the lifting member 68. Referring now to FIG. 7, the receiving means of the handle 66a comprises a U-shaped bracket 78 welded to the lower end 72 of the lifting member 68, and a pin 80 welded, formed or otherwise disposed within the bracket 78 coaxially with the longitudinal axis of the lifting member 68.

When the handle 66a is mounted on the cart 10, the pin 80 engages the lower bracing member 28 through a hole 82 defined in the lower bracing member 28, so that the U-shaped bracket 78 receives in a nesting manner the lower bracing member 28. The inside radius of the bracket 78 is substantially the same as the outside radius of the lower bracing member 28, so that the lower bracing member 28 is closely received within the bracket 78.

Nearer the upper end 70 of the lifting member 68, a bolt 84 is disposed through a hole 86 defined in the lifting member 68 and through a hole 88 defined in the transverse bracing member 38, the latter hole being aligned with the hole 86 in the lifting member 68. A nut 90, such as a wing nut, threadedly engages the bolt 84 for holding the lifting member 68 adjacent the transverse bracing member 38. The handle 66a is thus held securely, but releaseably so, in position by the close-fitting engagement of the bracket 78 and the pin 80 with the lower bracing member 28, and by the bolt 84 and the nut 90.

The lifting member 68 of the handle 66a is equipped also with a crossbar 92 to form a "T" at the upper end 70 of the lifting member 68, for receiving the hands of a user of the cart. The lifting member 68 is preferably of a sufficient length to permit the hands of the user to be conveniently located on the crossbar 92 during use of the cart 10 without excessive bending or stooping by the user.

As may be seen by reference to FIGS. 8-13, a second embodiment of the detachable handle, denoted by the reference numeral 66b, also comprises a lifting member 68, having an upper end 70 and a lower end 72, which is detachably connected to the transverse bracing member 38 intermediate the upper end 70 and the lower end 72 of the lifting member 68. As with the handle 66a the lifting member 68 is of a straight tubular or pipe construction, and is equipped with a crossbar 92 at its upper end 70.

Figure 8:
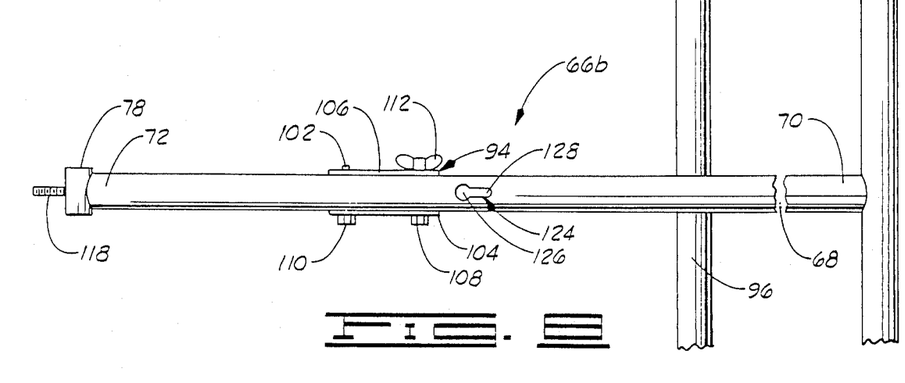
FIG. 8 is a plan view of a second embodiment of a detachable handle.
Figures 9, 10:
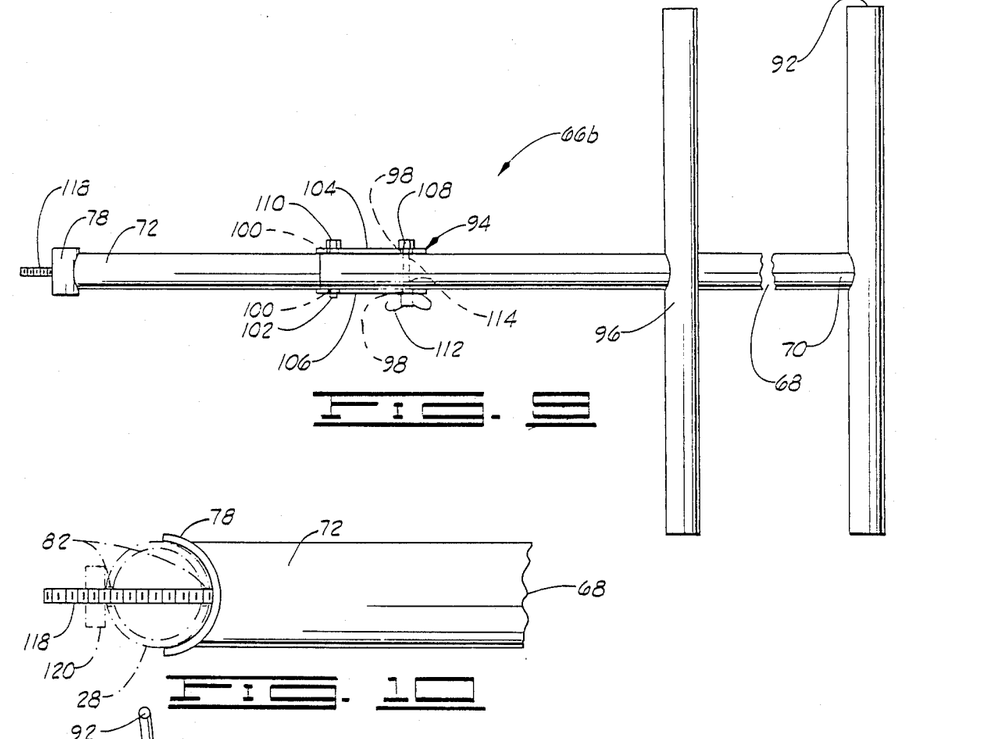
FIG. 9 is a bottom view of the second embodiment of a detachable handle.
FIG. 10 is a fragmentary side view of a receiving means of the second embodiment of a detachable handle.

A support stand comprising a stand bracket 94, a stand member 96 and means for fixing the stand member 96 in a selected one of a plurality of positions relative to the stand bracket 94 is also included. The stand bracket 94 is welded to the lifting member 68 intermediate the upper end 70 and the lower end 72, and defines two sets of holes 98 and 100. The stand member 96 is pivotally connected to the stand bracket 94 by means of a pin 102 which is retained through, such as by being welded to, both sides 104 and 106 of the stand bracket 94 and which extends through a hole 107 defined in the stand member 96.

The means for fixing the stand member 96 relative to the stand bracket 94 comprises nuts 108 and 110, welded to the side 104 of the stand bracket 94 adjacent the two sets of holes 98 and 100, respectively, and a wing bolt 112. The wing bolt 112 is inserted from the side 106 of the stand bracket 94 through either of the two sets of holes 98 and 100, and through a hole 114 defined through the stand member 96 which is selectively alignable with either of the two sets of holes 98 and 100. The wing bolt 112, when so inserted, threadedly engages either of the nuts 108 and 110 welded to the side 104 of the stand bracket 94.

Figures 11, 12:
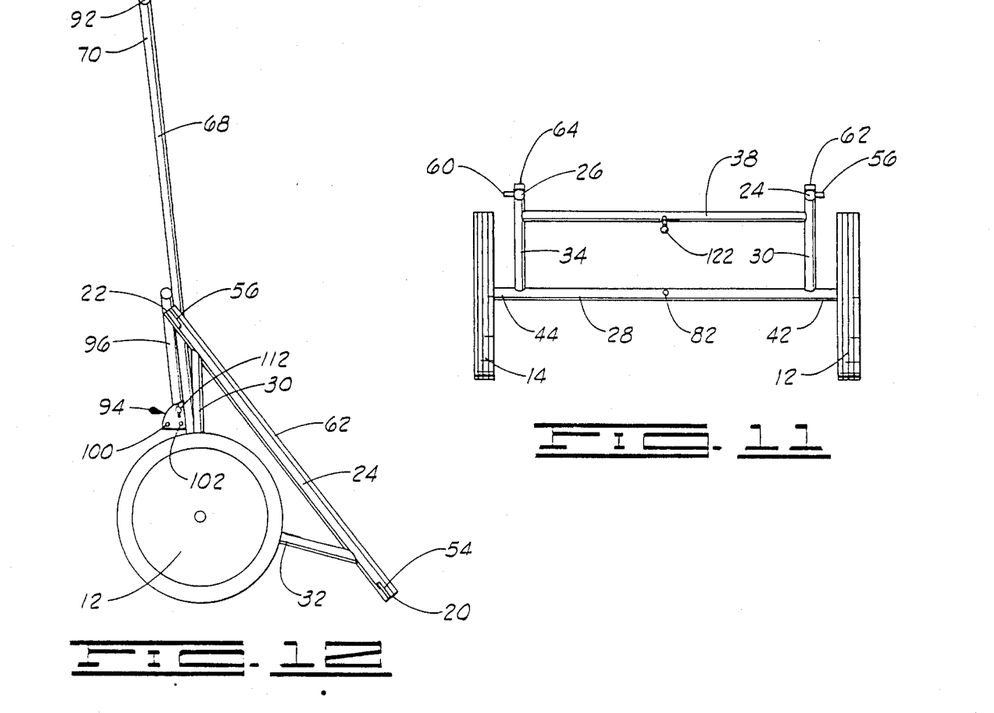
FIG. 11 is an end view of the cart adapted to receive the second embodiment of a detachable handle thereto.
FIG. 12 is a side view of the cart equipped with the second embodiment of a detachable handle having a stand shown in a traveling position.

To fix the stand member 96 in a traveling position as shown in FIG. 12 for moving a load from one location to another, the wing bolt 112 is inserted through the set of holes 98 and through the hole 114 defined through the stand member 96, to threadedly engage the nut 108. It can be seen that the stand member 96 is thus secured for traveling over even rough terrain without dragging the ground or otherwise impeding the progress of the cart 10.

Figure 13:
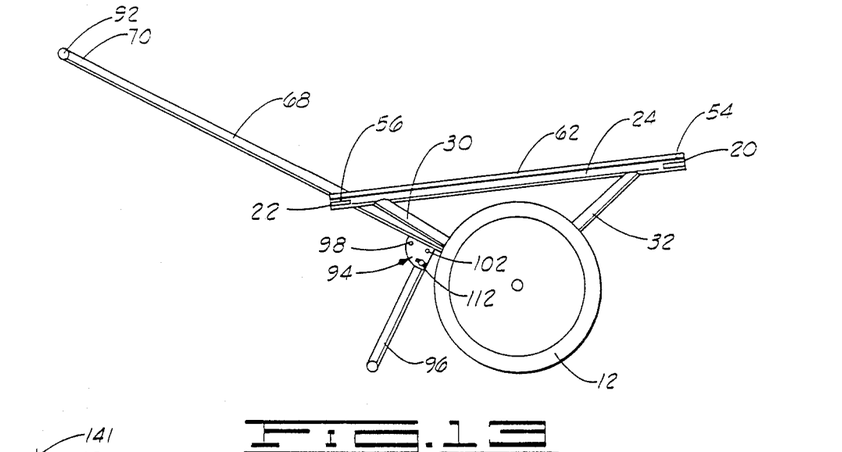
FIG. 13 is a side view of the cart of FIG. 12, with the stand of the detachable handle shown in a supporting position.

In similar fashion, the wing bolt 112 is inserted through the set of holes 100 and through the hole 114 to threadedly engage the nut 110 when it is desired to fix the stand member 96 in a supporting position shown in FIG. 13. In the supporting position shown in FIG. 13, the stand member 96 acts to support the cart 10 and a load (if any) in a sturdy, upright position by preventing the rearward pivoting of the frame 16 about its axis of pivotation 18 beyond the position shown in FIG. 13. The stand member 96 also acts, in the same capacity as the angular member 74 of the handle 66a, to place the upper end 70 of the lifting member 68 and the crossbar 92 within the user's grasp without undue stooping or bending on the user's part. Any load thus supported should, of course, have its weight centered on the handle side of the axis of pivotation 18 to prevent the pivoting of the frame 16 to a forward position wherein the front end 20 of the frame 16 tilts forward to engage a support surface 116 and the back end 22 is raised (see FIG. 14A).

The detachable handle 66b also comprises receiving means for receiving the lower bracing member 28 into detachable engagement with the lower end 70 of the lifting member 68. Referring in particular to FIG. 10, such receiving means comprises a U-shaped bracket 78 welded to the lower end 72 of the lifting member 68, a threaded pin 118 welded, formed or otherwise disposed within the bracket 78 coaxially with the longitudinal axis of the lifting member 68, and fastener means such as a nut 120 for fastening on the threaded pin 118 adjacent the lower bracing member 28.

When the detachable handle 66b is attached to the cart 10, the threaded pin 118 is disposed through the hole 82 defined in the lower bracing member 28, and the nut 120 threadedly engages the threaded pin 118 for holding the bracket 78, and thus the lifting member 68, adjacent the lower bracing member 28. As with the handle 66a, the inner radius of the bracket 78 is substantially the same as the outer radius of the lower bracing member 28, so that the lower bracing member 28 is closely received within the bracket 78 when the nut 120 is fastened on the threaded pin 118 and tightened. It can be seen that the close reception of the lower bracing member 28 within the bracket 78 provides stability to the attachment of the lifting member 68 to the lower bracing member 28 without the need for overtightening of the nut 120.

The handle 66b is detachably connected also to the transverse bracing member 38. This connection is accomplished by means of a retaining stud 122 connected to the transverse bracing member 38 and by means of a slot 124 defined in the lifting member 68 for engaging the retaining stud 122. The slot 124, as best shown in FIG. 8, has a circular slot portion 126 and an elongated slot portion 128. The retaining stud 122, which as depicted in FIG. 11 can be merely a bolt which threadingly engages the hole 88 defined in the transverse bracing member 38, first enters the circular slot portion 126 and then is caused to enter the elongated slot portion 128 as the handle 66b is moved to insert the threaded pin 118 through the hole 82 defined in the lower bracing member 28. The fastening of the nut 120 on the threaded pin 118 secures the handle 66b with the retaining stud 122 held in the elongated slot portion 128. It can thus be seen that both embodiments of the detachable handle 66 are detachably connected to both the lower bracing member 28 and to the transverse bracing member 38.

Figure 14A:
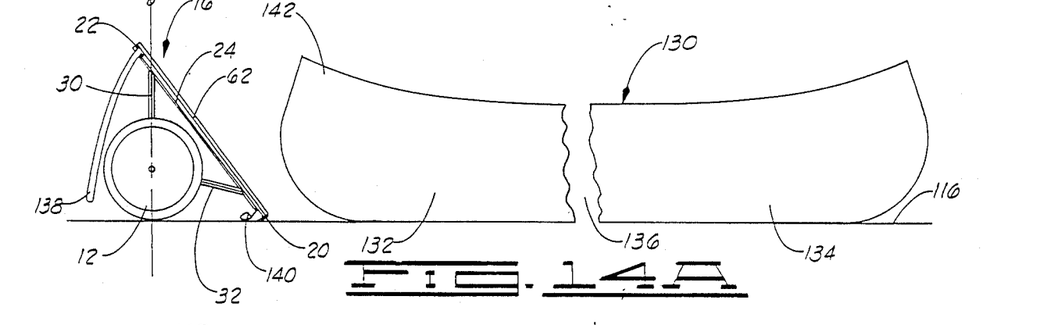
FIG. 14A is a side view of the cart of FIG. 1 shown in a forward position, which cart is equipped with strap means and adjacent a first portion of a canoe.
Figure 14B:
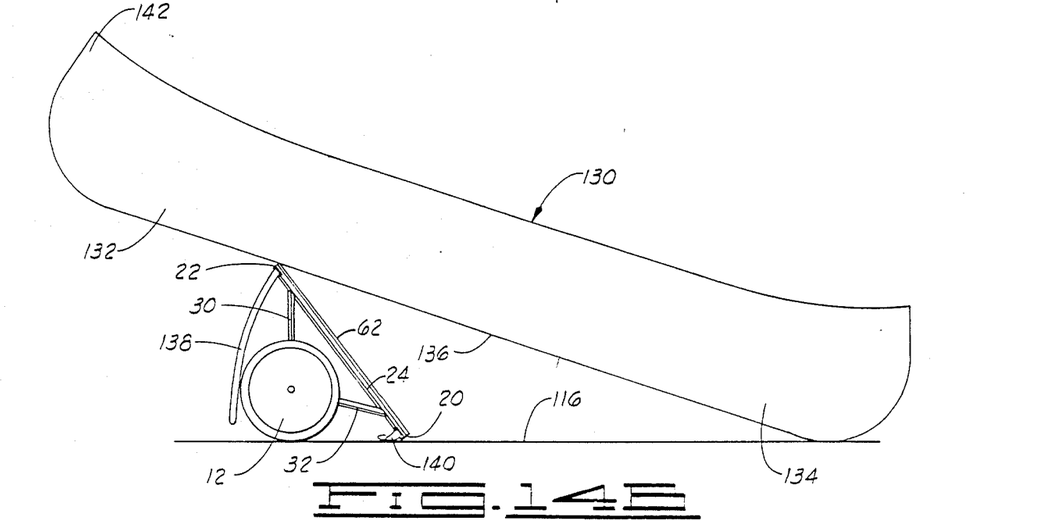
FIG. 14B is a side view of the embodiment of FIG. 14A, with the first portion of the canoe having been lifted and moved over the raised back end of the cart.
Figures 15, 16:
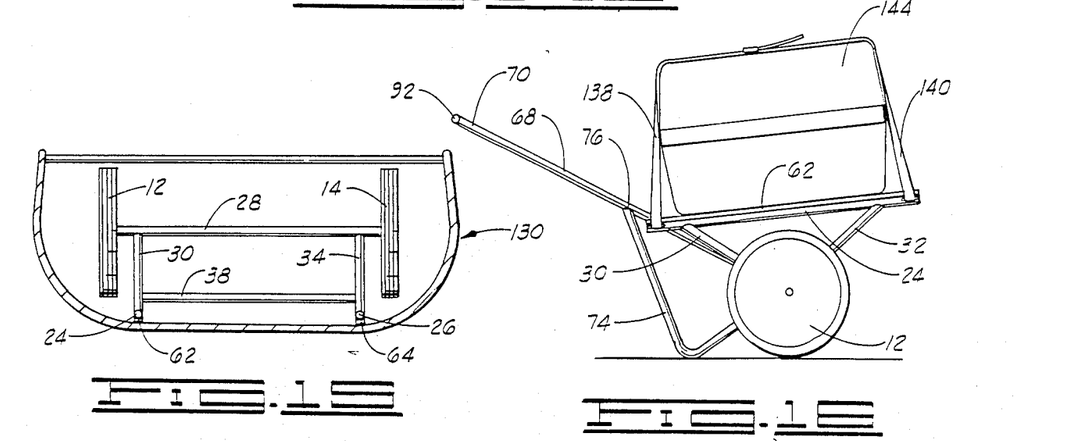
FIG. 15 is a sectional view of a portion of a canoe, showing the cart stored in such canoe.
FIG. 16 is a side view of the cart equipped with the first embodiment of a detachable handle and with strap means for strapping a load to the preferred embodiment.

The cart's structure, without either of the aforementioned handles, makes it useful for moving a small water craft such as a canoe along the support surface 116 which is of a type that can support the wheeled cart 10 and the craft. Referring now to FIGS. 14A through 15, the cart 10 is placed near a canoe 130 having a first portion 132, a second portion 134, and a central portion 136 intermediate the first portion 132 and the second portion 134 of the canoe 130. Both the cart 10 and the canoe 130 rest on the support surface 116, with the cart 10 shown in FIG. 14A as having already been pivoted to a forward position wherein the front end 20 of the frame 16 engages the support surface 116, and wherein the back end 22 of the frame 16 is raised for receiving the canoe 130. The cart 10, as earlier described and further comprising strap means such as straps 138 and 140 connected to tie-down brackets 54, 56, 58 and 60, is used by first pivoting the frame 16 of the cart 10 about its axis of pivotation 18 to its forward position, which step has been accomplished in FIG. 14A. The user then lifts the first portion 132 of the canoe 130, so that the first portion 132 of the canoe 130 no longer rests entirely on the support surface 116, and moves the first portion 132 over the raised back end 22 of the frame 16, as in FIG. 14B. This movement can be accomplished by simply lifting and pulling on the end 142 of the first portion 132 of the canoe 130. The user continues to move the first portion 132 over the back end 22 until the center portion 136 engages the back end 22 of the frame 16.

Figure 14C:
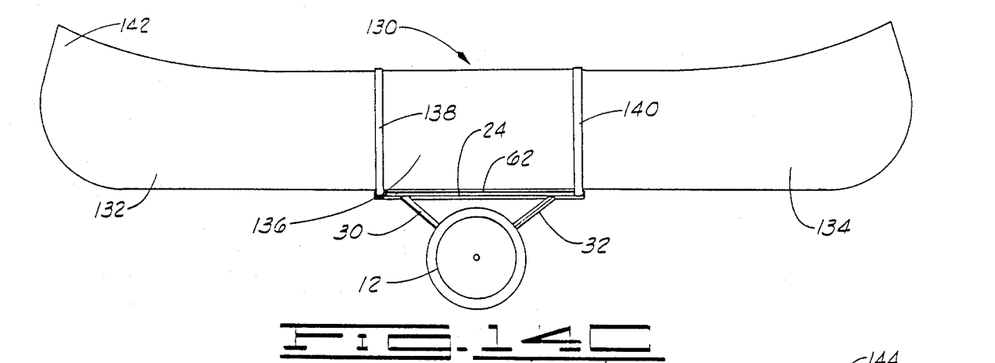
FIG. 14C is a side view of the cart and canoe of FIG. 14B moved to a horizontal position.

The cart 10 is preferably constructed, as shown in FIGS. 14A–15, so that, when the frame 16 is pivoted forward as in FIG. 14A, one or both of the two spaced upper skid members 24 and 26 intersect a plane 141 containing the axis of pivotation 18 defined by the member 28 and extending perpendicularly to the support surface 116. With such a construction, as the central portion 136 of the canoe 130 engages the back end 22 of the frame 16, the weight of the first portion 132 of the canoe 130 causes the frame 16 to pivot about its axis of pivotation 18 to a horizontal position shown in FIG. 14C. In the horizontal position, only the two wheels 12 and 14 of the cart 10 engage the support surface 116.

In any event, after the center portion 136 has been moved into engagement with the back end 22 of the frame 16, the user pivots the frame 16 rearward to a horizontal position as by pressing or otherwise lowering the first portion 132 toward the support surface 116. Straps 138 and 140 are used to secure the canoe 130 to the upper skid members 24 and 26 and thus to the cart 10 for traveling. The interior of the canoe 130 can be used in this position to carry other items such as fishing gear, paddles, lifejackets or the like, preferably provided such items are distributed sufficiently throughout the interior of the canoe 130 to not unduly interfere with the balance of the canoe 130 upon the cart 10. The user can, of course, adjust the position of the canoe 130 upon the cart 10 as needed or desired. It is contemplated also that the canoe 130 may be mounted on the cart 10 so that the canoe 130 is inverted from the position shown in FIGS. 14A through 15. The interior of the canoe 130 would normally be unavailable for carrying such other items as have been listed in such a circumstance, however.

The cart 10 and the mounted canoe 130 are moved to a desired destination by applying a force to the canoe 130 to rotate the wheels 12 and 14 of the cart 10, as by pulling or pushing on the end 142 of the canoe 130 in a direction substantially parallel to the support surface 116. After transporting the canoe 130 to the desired destination, the canoe 130 can be pulled or pushed off the cart 10 as desired. When the canoe 130 has been removed, the cart 10, being preferably sufficiently small, can be stored within a portion of the canoe 130 itself as illustrated in FIG. 15.

Figures 17, 18:
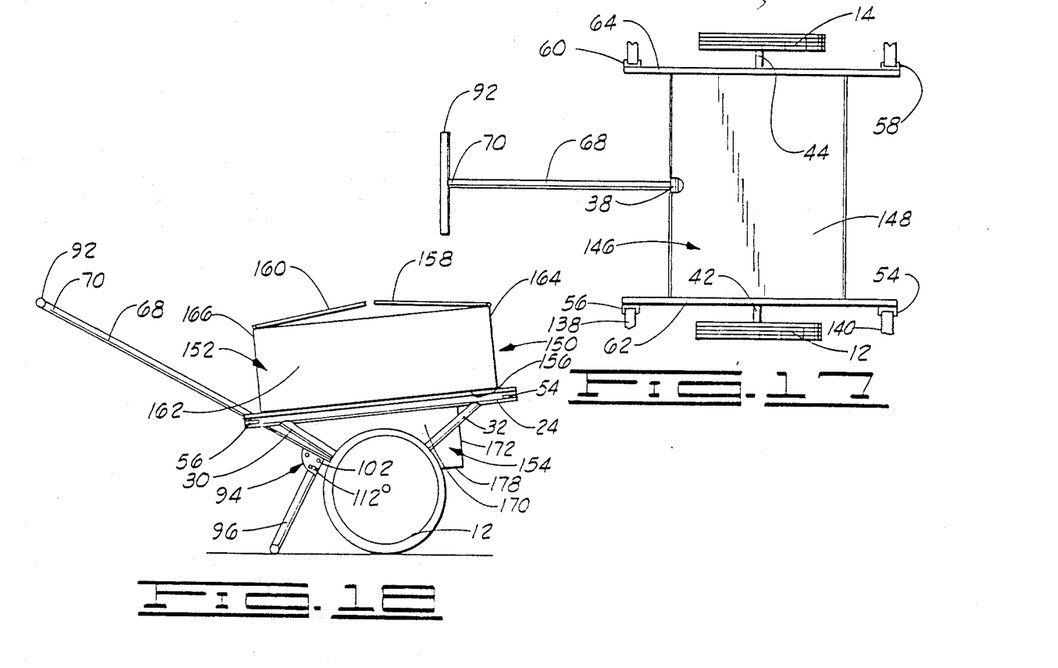
FIG. 17 is a plan view of the cart equipped with the second embodiment of the detachable handle and with a shelf having a deformable supporting surface.
FIG. 18 is a side view of the cart with the second embodiment of a detachable handle and with a box.

The versatility of the present invention is further illustrated by referring to FIGS. 16, 17 and 18. In FIG. 16, the cart 10 has employed the detachable handle 66a shown in FIGS. 4-7 and straps 138 and 140 for conveniently carrying item 144, which is capable of resting on upper skid members 24 and 26. It is contemplated that smaller items may be carried as additional skid members are introduced between the upper skid members 24 and 26. Items that are not suitable for being supported by the upper skid members 24 and 26, or by any additional skid members introduced between the upper skid members 24 and 26, can be supported by a shelf 146 connected to the transverse bracing members 38 and 40 below the upper skid members 24 and 26 in the embodiment shown in FIG. 17. This shelf 146 can include a deformable supporting surface 148 such as is provided if the shelf 146 is made of a flexible material (e.g., canvas). For particularly dense items, or for items of certain sizes and shapes, a deformable supporting surface 148 might function to inhibit slipping of the items with respect to the cart 10 by receiving the items in nesting fashion.

In the absence of a shelf 146, the cart 10 can be provided with a box 150 including an upper box portion 152 and a lower box portion 154, as shown in FIG. 18. The upper box portion 152 has a lower side 156 which rests on the transverse bracing members 38 and 40. The lower box portion 154 is connected to the lower side 156 of the upper box portion 152 and extends between the transverse bracing memers 38 and 40 toward the lower bracing member 28.

In the embodiment of the box shown in FIG. 18, the upper box portion 152 is equipped with two hinged lid portions 158 and 160 which are pivotally movable with respect to the box 150. The upper box portion 152 has four side portions which are connected to the lower side 156 and to which the hinged lid portions 158 and 160 are connected. Side portions 162, 164 and 166 are indicated in FIG. 18. A fourth side portion, not shown, is connected between the side portions 164 and 166 substantially parallel to the side portion 162.

The lower box portion 154 also has four side portions which extend downward from the lower side 156 of the upper box portion 152. Two side portions 170 and 172 are shown, with third and fourth side portions not shown connected between the side portions 170 and 172 substantially parallel to the side portions 170 and 172, respectively. The lower box portion 154 has a bottom side 178 connected to the side portions, and defines an opening in the lower side 156 of the upper box portion 152 to permit communication of articles or material between the upper box portion 152 and the lower box portion 154 of the box 150.

Thus, the present invention is well adapted to carry out the objects and attain the ends and advantages mentioned above as well as those inherent therein. While preferred embodiments of the invention have been described for the purpose of this disclosure, changes in the construction and arrangement of parts and in the performance of steps can be made by those skilled in the art, which changes are encompassed within the spirit of this invention, as defined by the appended claims.

What is claimed is:

1. A cart, comprising:
   bracing means for supporting a load, said bracing means including:
   a lower bracing member having a hole defined therein;
   an upper bracing member; and
   means for rigidly connecting said lower bracing member and said upper bracing member;
   two wheels connected to said bracing means;
   a handle detachably connected to both said lower bracing member and said upper bracing member, said handle including:
   a lifting member, having an upper end and a lower end, detachably connected to said upper bracing member intermediate said upper and lower ends;
   a support stand connected to said lifting member; and
   receiving means for receiving said lower bracing member into detachable engagement with said lower end of said lifting member, said receiving means including:
   a bracket disposed at said lower end of said lifting member;
   a threaded pin disposed within said bracket for passing through said hole defined in said lower bracing member; and
   fastener means for fastening on said threaded pin adjacent said lower bracing member;
   a retaining stud connected to said upper bracing member; and wherein
   said lifting member has a slot defined therein for engaging said retaining stud.

2. A cart defined in claim 1, wherein said support stand comprises:
   a stand bracket connected to said lifting member;
   a stand member pivotally connected to said stand bracket; and
   means for fixing said stand member in a selected one of a plurality of positions of said stand member relative to said stand bracket.

3. A cart as defined in claim 1, wherein said support stand comprises an angular member connected between said lower end of said lifting member and a portion of said lifting member intermediate said upper and lower ends.

4. A cart as defined in claim 1, further comprising a shelf connected to said bracing means.

5. A cart as defined in claim 4, further comprising:
   a first tie-down bracket connected to said bracing means;
   a second tie-down bracket connected to said bracing means; and
   strap means, connected to said first and second tie-down brackets, for securing a load to said shelf.

6. A cart as defined in claim 4, wherein said shelf includes a deformable supporting surface adapted to receive a load.

7. A cart as defined in claim 1, further comprising a strip of a resilient material connected to said bracing means.

* * * * *